Feb. 18, 1958   J. E. MANDLECO   2,824,184
SWITCH ACTUATING MECHANISM FOR HAY BALERS
Filed April 29, 1957   2 Sheets-Sheet 1
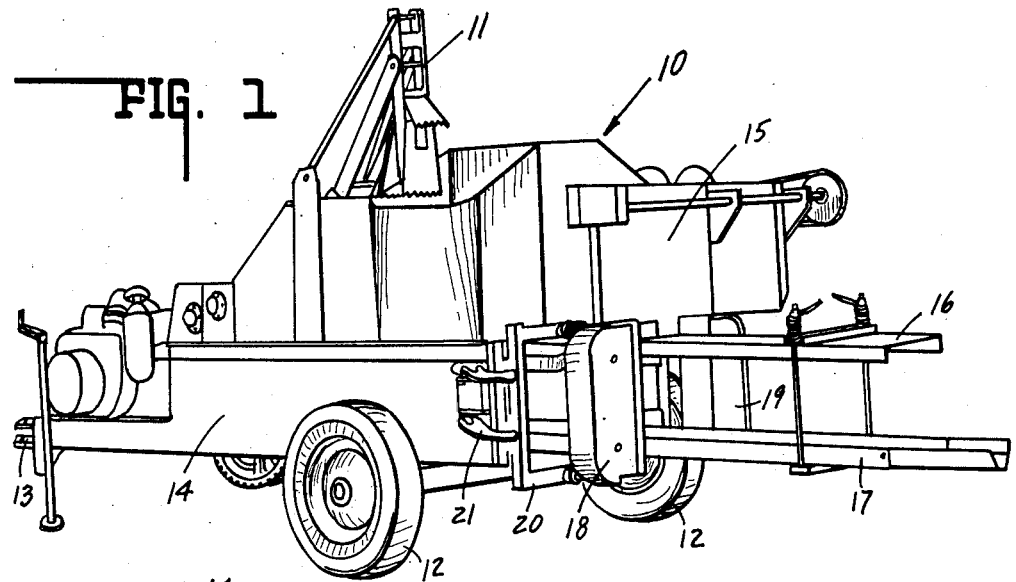
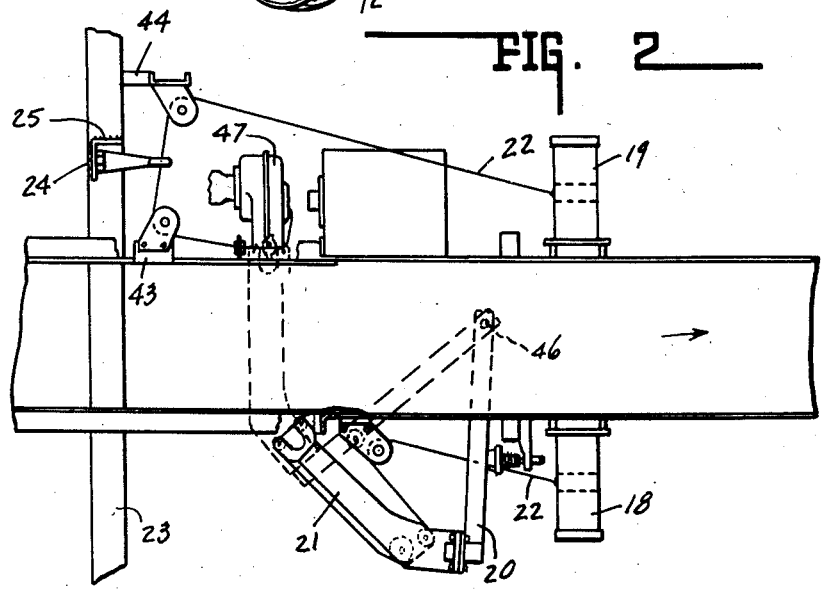
INVENTOR.
JAMES E. MANDLECO.
BY
Lockwood, Galt, Woodard + Smith
ATTORNEYS.

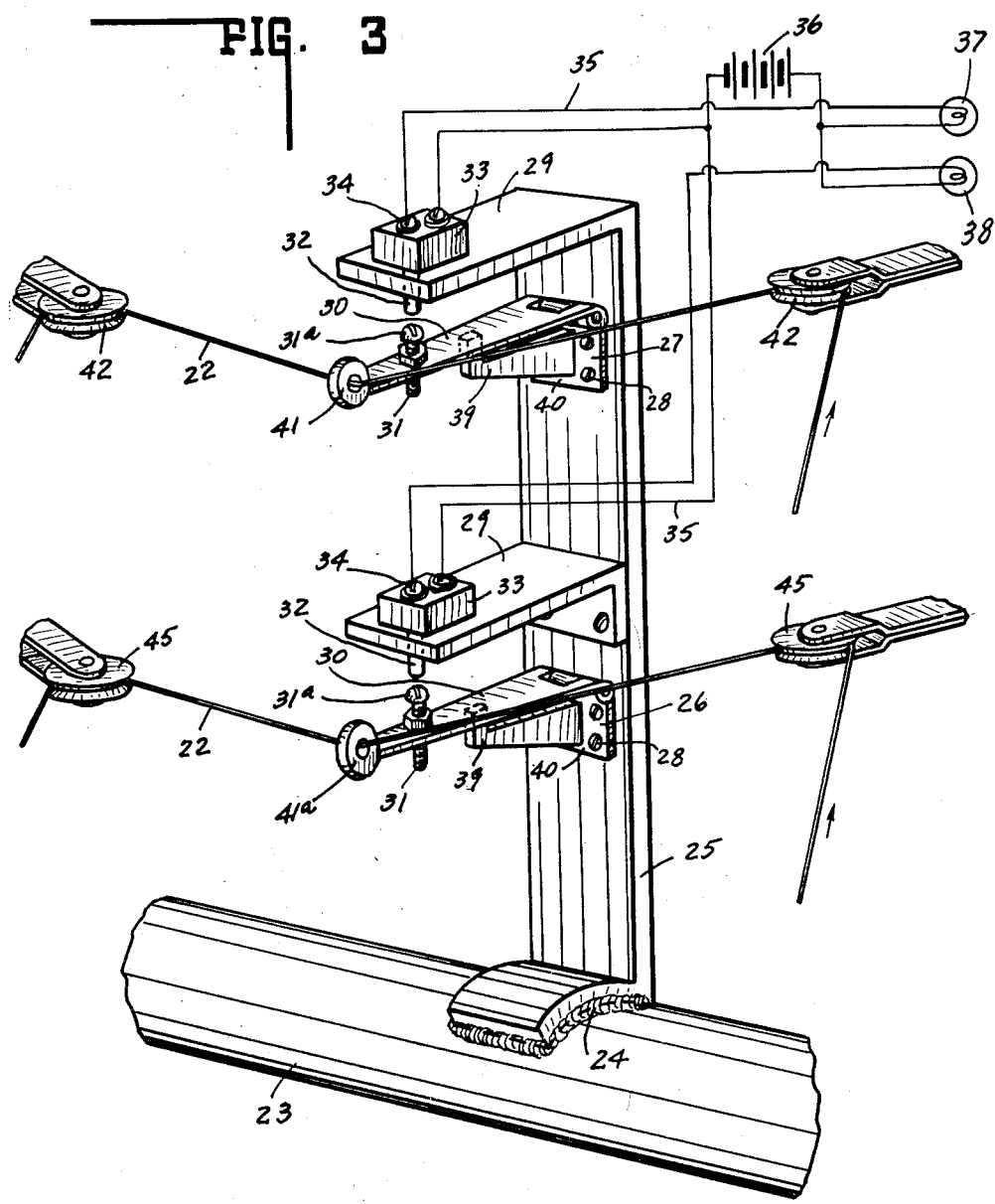

2,824,184
SWITCH ACTUATING MECHANISM FOR HAY BALERS

James E. Mandleco, Roachdale, Ind.

Application April 29, 1957, Serial No. 655,879

3 Claims. (Cl. 200—61.18)

This invention relates to a switch actuating mechanism for hay balers, and more particularly to a mechanism for signalling the operator of the hay baler by visible means, that the banding wire is either broken or is not feeding properly.

Heretofore in the use of automatic wire tie balers many problems have been presented by the failure of the wire to feed properly and of the knotter to tie the wire properly; and by similar malfunctions of the wire feeding mechanism. In view of the fact that trouble in the mechanism can stem from several different sources, it is difficult for the user to readily trace or identify the particular trouble with which he is being confronted. Furthermore, there is sometimes a considerable time lag between the commencement of the trouble and the spotting of it by the user, let alone the identifying of its character.

It is, therefore, the primary object of the present invention to provide signal means that are readily visible to the operator of the baler, to let him know not only that there is trouble but as well just what the trouble is, i. e. where it originates. To that end the primary feature of the invention resides in the arrangement of a switch actuating mechanism which will signal the operator that the knotter is not tying, that the wire is jammed in the wire box and similar "information."

It is a further object of the present invention to use the tension that is placed upon the bale tying wire in the conventional baler as the means or medium for actuating the switch that signals the operator. By so utilizing the tension through a rerouting of the tying wire a minimum number of working parts is necessary thereby reducing the expense as well as the upkeep and maintenance costs of the invention.

A still further object of the present invention is to provide a switch actuating mechanism which has a minimum number of parts, is simple to construct and to maintain or repair.

The full nature of the invention will be understood from the accompanying drawings and the following description and claims.

In the drawings:

Fig. 1 is a perspective view of an automatic wire tie baler.

Fig. 2 is a top plan schematic view of the invention and associated parts such as the wire box, the knotter, the bale chamber and the shuttles.

Fig. 3 is a schematic view of the invention itself, showing the particular hinge mechanism which actuates the switch when the requisite tension is placed upon the bale tying wire.

In the drawings a conventional automatic wire tie baler is shown generally at 10, it comprising the usual tramper 11, wheels 12, tractor hitch 13, bale chamber 14, cross feed housing 15, bale chamber rear top and bottom sections 16 and 17, opposed wire cans or boxes 18 and 19, shuttle frames 20 and shuttles 21. Other conventional parts will readily be recognized in Fig. 1 of the drawings.

In Figs. 2 and 3 of the drawings the construction and arrangement of the working parts of the invention are shown. There the axle 23 of the baler is shown to have welded thereupon as at 24 a switch support post or upright 25. Lower and upper hinge constructions shown generally at 26 and 27 respectively are mounted by any suitable means such as screws 28 upon the post which as will be observed has a pair of flanges 29. One of these is formed at the upper extremity of the support and the other at a point intermediate the upper extremity and the axle as shown in Fig. 3.

The arm or leaf 30 of each hinge is provided with an adjustable bolt 31 which is positioned immediately below push button 32 mounted in each flange. The push button in turn actuates the switch in switch box 33 carried by the flange. Normally, however, the push button is biased out of switching contact by spring means in the flange (not shown). The terminals 34 are connected by lead lines 35 to the battery 36 which in turn is connected to a top and bottom light 37 and 38 respectively. The lights are mounted within ready view of the operator of the tractor that is pulling the baler.

It will be observed particularly by reference to Fig. 3 that the hinge arms 30 will normally rest upon a stop 39 which is connected to the hinge plate 40 and extends outwardly therefrom so as to underlie the pivotally movable part of the hinge. It will also be noted that the movable leaves of the hinges are provided at their outer extremities with eyes 41 and 41a through which passes the banding wire 22.

On opposite sides of the post and of the eyelets is a pair of idler pulleys or guide sheaves. The upper pair 42 is mounted to adjacent portions of the baler frame as indicated at 43 and 44 in Fig. 2. The lower pair 45 of idler pulleys or sheaves is similarly secured to adjacent portions of the baler frame. It will be observed that the upper pair of pulleys lies in a higher plane than the eyelet 41 and that the lower pair is mounted in a higher plane than the eyelet 41a.

At such times as the movable hinge plates are at rest upon stops 39 the heads 31a of the adjustable actuating bolts will be spaced downwardly from the push buttons. Obviously at such times the electric circuit will not be closed. However, once the respective banding wires are under sufficient tension they will cause the hinge plates to move upwardly thereby bringing the heads of the bolts into actuating engagement with the push button to close the circuit, light the lights and thereby signal the operator.

The intermittent tensioning of the banding wire is, as before stated, a characteristic of the conventional automatic wire tie balers. This tensioning is caused by the compressing in the bale chamber of a wad of hay. The hay is moved back into the chamber by the conventional ram or plunger (not shown). As it moves it engages the upper and lower banding wires which span or bridge the bale chamber. These upper and lower wires will have been left as the shuttles withdraw to permit the entrance of the next charge of hay in the conventional manner. The engagement of this next charge with these wires puts some tension upon them but as they are pushed back by the plunger and unreel from their boxes they are placed under full tension.

In properly timed sequence the shuttles which are pivoted at 46 to the frame will enter the bale chamber and pass through openings in the plunger until they engage the knotter in the knotter box 47. At such time in conventional manner the wires from the right and lefthand coils are disposed side by side in the twister pinions (not shown) of the knotter. These pinions revolve, twisting the wires together. On the last revolution of the twister pinions the twisted portion is cut in two and each twisted end is conventionally kinked thereby forming a knot that is as strong as the wire. Four knots will have been completed, two remaining on the bale in the chamber thus forming a completely tied bale. The other knots join the right and lefthand coils together so that when the shuttles withdraw as aforesaid, the wires will extend across the bale chamber, ready for the next bale. Each time that a bale is being formed, i. e. pushed back by the plunger, the wires will be placed under tension and will automatically lift the plates 30 so that the head of the adjustable bolt will actuate the switch by compressing the push button.

Once the bale has been formed and the shuttles retracted, the tension will be relieved and the plates will fall by gravity to their normal rest position shown in Fig. 3. With this operation it is apparent that the bulbs that are visible to the eye of the operator will intermittently be lighted. This will be at the precise time that the wires are placed under tension by the action of the plunger upon the charge of hay. So long as the light comes on intermittently in this fashion the operator will know that his knotter has not missed but is functioning properly.

The commonest cause of trouble in the knotter is the intrusion of weeds, sticks or the like into the knotter slot or in the twister gear, thereby keeping the wires from meshing and being twisted together during the tying operation. This trouble will not be eliminated in any way by the mechanism of the present invention but the important thing is for the operator to know that it has happened so that he may remedy the trouble by rethreading the knotter. The present invention will signal the operator at such times as the knotter is not functioning properly. This is done in a negative way in that the lights will not go on intermittently. However, the mechanism does provide the operator with information as to where the trouble lies. For example, if the light does not go on at all the trouble in all probability is with the knotter. On the other hand, if the light stays on continuously then the trouble probably is stemming from a jamming of the wire in the wire box. At such times the light will be on continuously for the reason that the wire will always be under tension.

In operation the lights that are visible to the operator will consist of an upper and a lower one mounted preferably on the cross feeder. The top light is an indicator for the top wire while the bottom one is for the bottom wire. While the baler is working properly the lights will blink each time a charge of hay is compressed by the ram. If the light does not blink the wire is broken and must be rethreaded. On the other hand, as stated, if the lights come on and stay on this is probably because the wire is not feeding properly off of the spools in the wire can or is fouled up in the pulley or elsewhere. The operator will then know not only that it is necessary for him to correct the difficulty but as well what the difficulty is and where it lies.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a baler including a bale chamber, a material compressing plunger reciprocal therein and banding wire feeding into said chamber for tying the material to be baled, said wire being unreeled and placed under tension by the material as it is compressed into bale form; the combination of a switch mounted on said frame for operating a signal, a push button for actuating said switch, said push button being movable from a normal rest position to a second switch actuating position, and means operably associated with said wire and with said push button for actuating said switch each time the wire is tensioned by the compression of the material, said means comprising a pivotal member mounted on the frame in proximity to said push button and including an eye at one end for reception of the wire, said member being pivoted into operable engagement with said push button upon the tensioning of said wire.

2. In a baler including a bale chamber, a material compressing plunger reciprocal therein and banding wire feeding into said chamber for tying the material to be baled, said wire being unreeled and placed under tension by the material as it is compressed into bale form; the combination of a switch mounted upon said baler for operating a signal discernible by the operator of the baler, a push button operably associated with said switch and movable into and out of actuating association therewith, and means responsive to the tensioning of said wire for moving said push button into switch actuating position, said means including a movable plate mounted upon said frame in proximity to said push button and movable into and out of engagement therewith, said plate having an eye for reception of said wire, and an adjustable element mounted on said plate and adjustable towards and away from said push button whereby upon the tensioning of said wire through the compression of said material said plate and its adjustable element will be moved into engagement with said push button for actuating said switch.

3. In a baler including a bale chamber, a material compressing plunger reciprocal therein and banding wire feeding into said chamber for tying the material to be baled, said wire being unreeled and placed under tension by the material as it is compressed into bale form; the combination of a support member mounted upon said baler generally in the path of said wire, at least one hinge secured to said member, said hinge including a movable plate having an eye formed adjacent its free end for reception of said wire, a stop connected to said hinge and underlying said plate for limiting the movement thereof in one direction, a projecting adjustable element connected to said plate and movable towards and away from said plate; and a switch mounted upon said baler for operating a signal discernible by the user of the baler, said switch including push button means in proximity to said element movable to and from switch actuating position, whereby upon the tensioning of said wire by the compression of said material said plate and said element are moved into engagement with said push button for actuating said switch.

References Cited in the file of this patent

UNITED STATES PATENTS

| 1,506,152 | Berdon | Aug. 26, 1924 |
| 2,640,893 | Stalzer | June 2, 1953 |
| 2,713,621 | Hoffman | July 19, 1955 |